United States Patent [19]
Schad

[11] Patent Number: 6,120,722
[45] Date of Patent: Sep. 19, 2000

[54] TIEBAR REMOVAL METHOD AND APPARATUS

[75] Inventor: Robert D. Schad, Toronto, Canada

[73] Assignee: Husky Injection Molding Systems Ltd., Canada

[21] Appl. No.: 09/163,489

[22] Filed: Sep. 30, 1998

Related U.S. Application Data

[60] Provisional application No. 60/095,643, Aug. 7, 1998.

[51] Int. Cl.⁷ .................................................. B29C 45/17

[52] U.S. Cl. ...................... 264/328.1; 29/426.5; 164/341; 264/334; 425/190; 425/589; 425/595

[58] Field of Search ................................ 425/190, 192 R, 425/588, 589, 595, 451.9; 264/328.1, 334; 29/426.5; 164/341

[56] References Cited

U.S. PATENT DOCUMENTS

| | | | |
|---|---|---|---|
| 3,882,588 | 5/1975 | McFalls et al. | 425/190 |
| 3,951,579 | 4/1976 | Myers et al. | 425/190 |
| 4,025,264 | 5/1977 | Hehl | 425/190 |
| 4,285,384 | 8/1981 | Wunder | 425/589 |
| 5,017,120 | 5/1991 | Holzinger et al. | 425/192 R |
| 5,417,913 | 5/1995 | Arend | 425/595 |
| 5,542,465 | 8/1996 | Wolniak | 164/341 |
| 5,620,723 | 4/1997 | Glaesener et al. | 425/595 |
| 5,624,695 | 4/1997 | Glaesener et al. | 425/589 |
| 5,645,875 | 7/1997 | Glaesener et al. | 425/589 |
| 5,753,153 | 5/1998 | Choi | 425/595 |

*Primary Examiner*—James P. Mackey
*Attorney, Agent, or Firm*—Bachman & LaPointe, P.C.

[57] ABSTRACT

A tiebar removal method and apparatus for tiebar removal in a two (2) platen injection molding machine wherein some of the tiebars may be removed while others remain in the injection molding machine.

22 Claims, 6 Drawing Sheets

6,120,722

TIEBAR REMOVAL METHOD AND APPARATUS

CROSS-REFERENCE TO RELATED APPLICATION

This application claims the benefit of Provisional Application Ser. No. 60/095,643, filed Aug. 7, 1998 for TIEBAR REMOVAL METHOD AND APPARATUS, By Robert D. Schad.

BACKGROUND OF THE INVENTION

It has long been known that tiebar removal is a necessary feature for most molding machines, especially desirable to provide additional clearance and access for oversize molds being installed between the machine's platens.

Thus, for example, in an 8000 ton injection molding machine equipped with eight tiebars, four positioned along the bottom and four positioned along the top of the machine, it would be highly desirable to be able to conveniently and expeditiously remove 1–3 of the top tiebars to allow for mold changes as with an overhead crane to swing the molds in place from above.

Accordingly, it is a principal object of the present invention to provide a tiebar removal method and apparatus.

It is a further object of the present invention to provide a method and apparatus as aforesaid which conveniently and expeditiously removes tiebars from a molding machine.

Further objects and advantages of the present invention will appear hereinbelow.

SUMMARY OF THE INVENTION

In accordance with the present invention, the foregoing objects and advantages are readily achieved.

The method and apparatus of the present invention removes tiebars from a horizontal clamp device, generally on an injection molding machine, wherein at least one of the machine tiebars remain non-removable, and generally most of the machine's tiebars remain non-removable. The machine is a two (2) platen horizontal clamp machine with one platen desirably stationary and one platen desirably movable. In accordance with the present invention, the removable tiebars are desirably shorter than the non-removable tiebars. The removable tiebars are unclamped from the stationary platen and the movable platen with removable tiebars moved away from the stationary platen preferably supported solely by the movable platen. The removable tiebars are positioned such that they are firmly held in the movable platens securing/clamping assembly when they are being disengaged and moved away from the stationary platen. The non-removable tiebars provide alignment and support for the movable platen as the movable platen moves the removable tiebars. The removable tiebars are then removed to provide clearance for mold changes or the like, and the operation reversed.

Further features and advantages of the present invention will appear hereinbelow.

BRIEF DESCRIPTION OF THE DRAWINGS

The present invention will be more readily understandable from a consideration of the accompanying exemplificative drawings, wherein.

DETAILED DISCUSSION OF PREFERRED EMBODIMENTS

Figure 1:
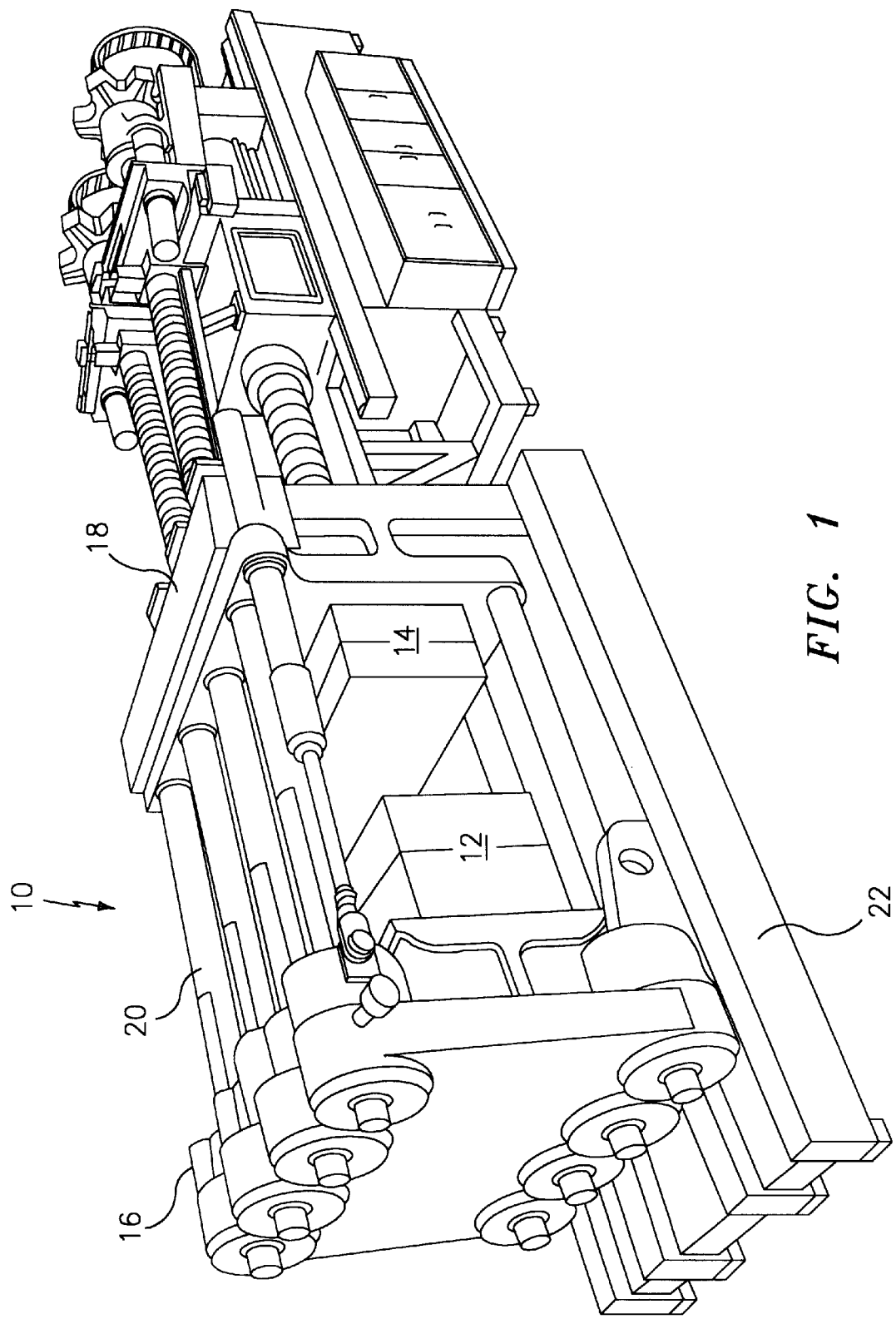
FIG. 1 is a perspective view of a representative injection molding machine for use with a tiebar removal system of the present invention.

FIG. 1 is a perspective view of a representative injection molding machine 10 for use with a tiebar removal system of the present invention. Machine 10 includes mold halves 12, 14 (shown in the mold open position) affixed to platens 16, 18 which move on eight tiebars 20, four of which are above the mold halves and four below the mold halves. In the mold closed position, the mold halves form at least one mold cavity for the formation of molded objects. Generally, one of the platens will be stationary and one movable, as will be described below. Naturally, the mold halves may contain a plurality of molds, if desired.

Figure 2:
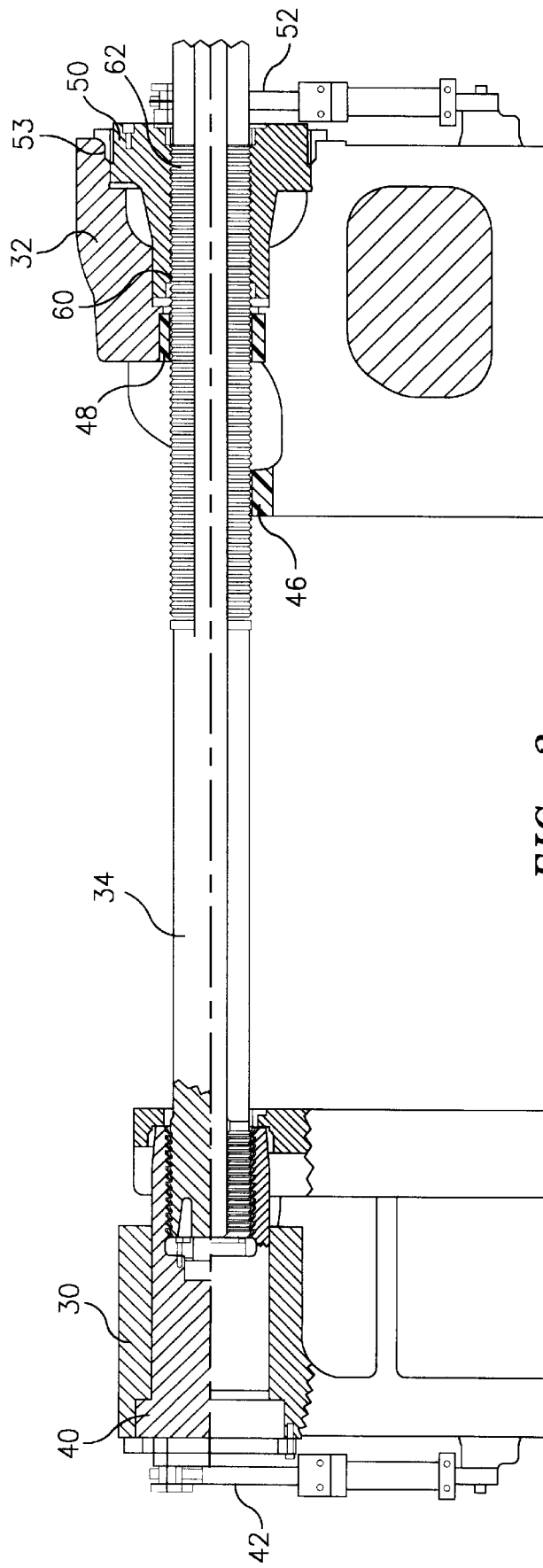
FIG. 2 is a sectional view through one tiebar assembly and FIG. 2A is an enlarged partial section view of a portion of the tiebar assembly of FIG. 2.

FIG. 2 is a sectional view through one tiebar assembly. In accordance with the present invention, less than the total number of tiebars will be removable. For example, in the case of the machine of FIG. 1, three of the eight tiebars will be removable and five non-removable, i.e., three tiebars above the mold halves will be removable.

FIG. 2 shows stationary platen 30 and movable platen 32 with removable tiebar 34 extending therebetween. The stationary platen 30 is fastened to the machine base 22, see FIG. 1. Movable platen 32 contains a clamping means for clamping the movable platen to the tiebars such as shown in U.S. Pat. Nos. 5,624,695, 5,645,875, 5,620,723 and 5,753,153, the disclosures of which are incorporated herein by reference. Stationary platen 30 contains a clamping means for the removable tiebars similar in construction and operation to the securing means in the movable platen, and a securing means for the non-removable tiebars as will be described below.

Figure 3:
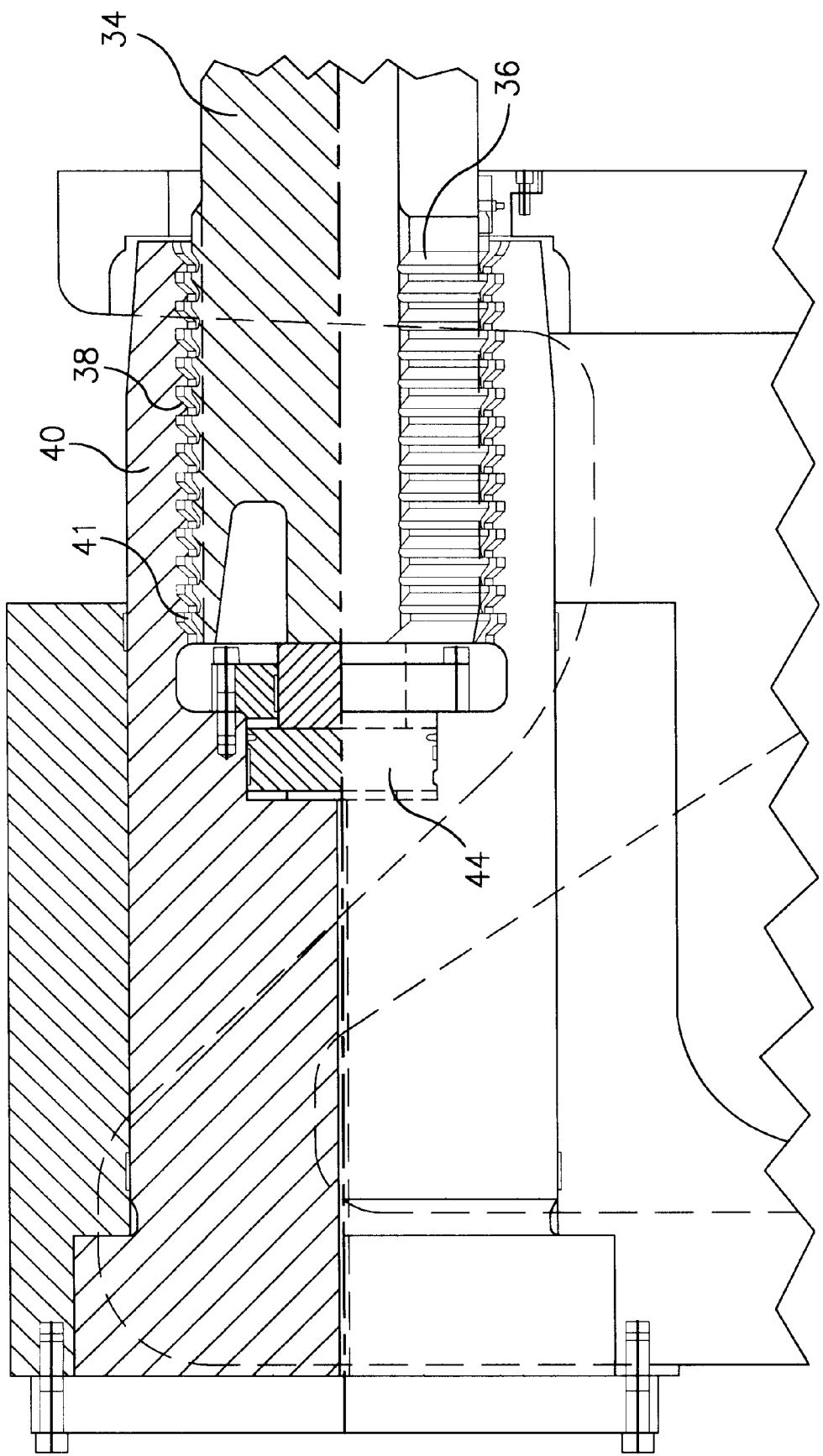
FIG. 3 is a detail view of one tiebar assembly and FIG. 3A is an enlarged partial sectional view of a tiebar securing method.
Figure 3A:
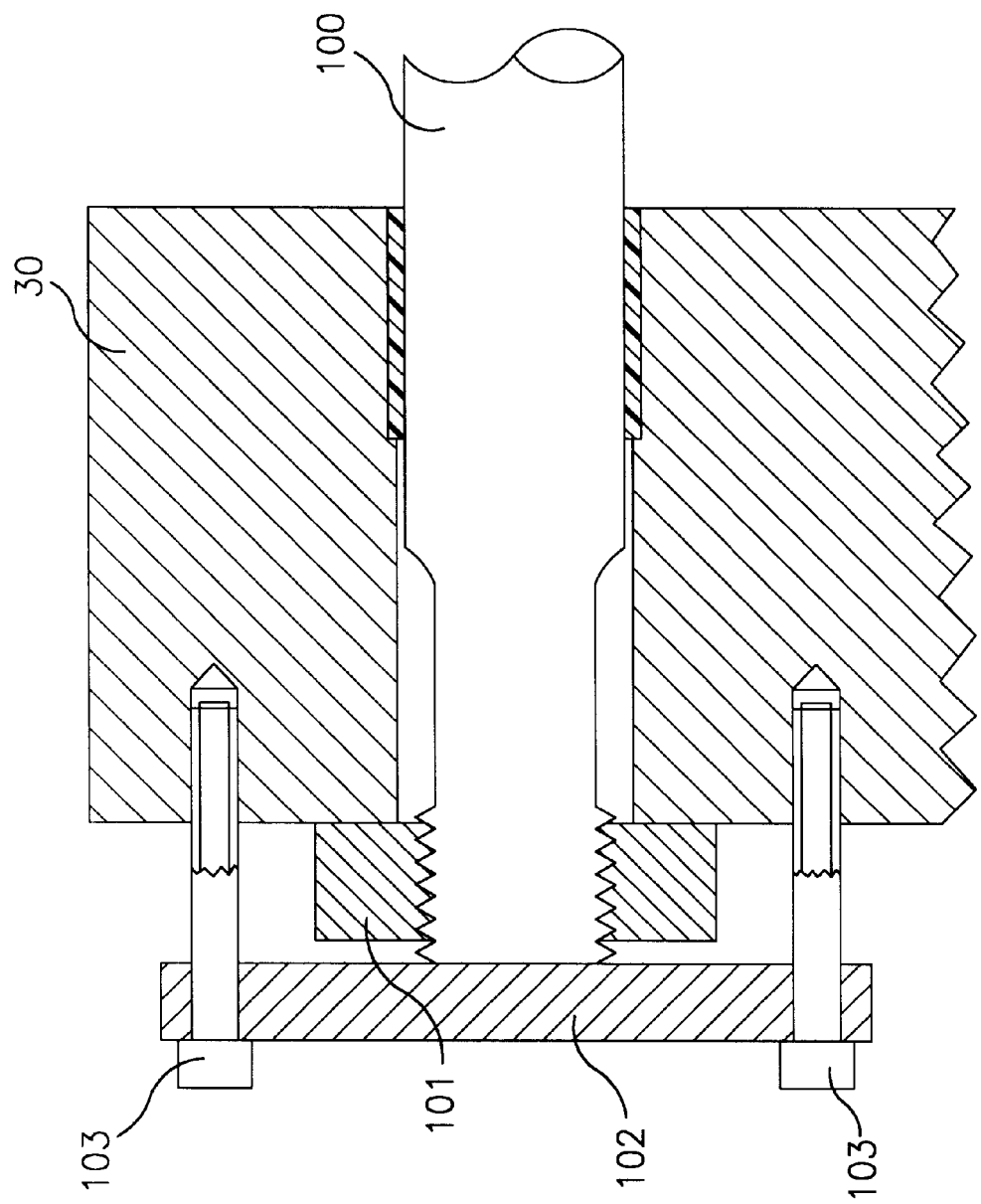

FIG. 3 shows an enlarged view of the preferred stationary platen clamping means which is used on the removable tiebars only in the stationary platen, although other stationary platen clamping means may be employed. The non-removable tiebars in the stationary platen use a simple securing means and may desirably employ a simple nut and thread assembly for securing the non-removable tiebars to the stationary platen in a conventional fashion as shown in FIG. 3A. FIG. 3A shows stationary platen 30 with non-removable tiebar 100 secured by nut 101. Locking plate 102 is held against the tiebar end by screws 103 to preload the tiebar nut and prevent loosening.

Referring to FIGS. 2–3, removable tiebar 34 includes teeth 36 that engage teeth 38 in locking sleeve 40, which in turn may be rotated by cylinder 42 as shown in FIG. 2. Thus, the locking sleeve 40 may be rotated to disengage locking sleeve teeth 38 from tiebar teeth 36 so that the removable tiebars are free to move. As clearly shown in FIG. 3, there is a gap 41 between these two sets of teeth to provide clearance for rotation. It is important to take up this clearance before operation of the machine so that proper clamping is achieved and also to prevent premature wear by fretting of the teeth. In order to eliminate clearance after rotation is complete piston 44 is activated by hydraulic pressure to push against the end of tiebar 34, urging the tiebar away from locking sleeve 40 and thereby eliminating clearance between the teeth. The force exerted by piston 44 must exceed the designed for mold break force that the clamp piston will exert during mold opening.

In order to remove the removable tiebars, first the pressure on piston 44 must be vented to allow clearance to be provided to permit sleeve 40 to rotate to disengage its teeth from the teeth on the removable tiebars.

FIG. 2 also shows movable platen tiebar support 46, movable platen tiebar guide 48, clamp piston 50 and clamp locking cylinder 52.

In accordance with the sequence of operations, the movable platen 32 is first moved to the position shown in FIG. 2 which is the maximum shutheight location to accommodate the largest mold. This enables clamp piston teeth 60 to engage tiebar teeth 62 on the far end of the tiebars in the movable platen 32. The clamp piston teeth 60 and tiebar teeth 62 on the movable platen are essentially the same as the corresponding teeth on the stationary platen for the removable tiebars with a gap therebetween which may be closed as in the stationary platen. The clamp pistons 50 on the movable platen 32 are moved or lined up to the locking position. This is followed by locking all eight clamp pistons on the movable platen, while all tiebars are locked in the stationary platen. The non-removable clamp pistons on the movable platen are then desirably disabled by any desired means, e.g., they may be electrically disabled or provided with disable valves which may be closed, so that they cannot be unlocked and only the three removable tiebars can be unlocked on the movable platen.

Figure 2A:
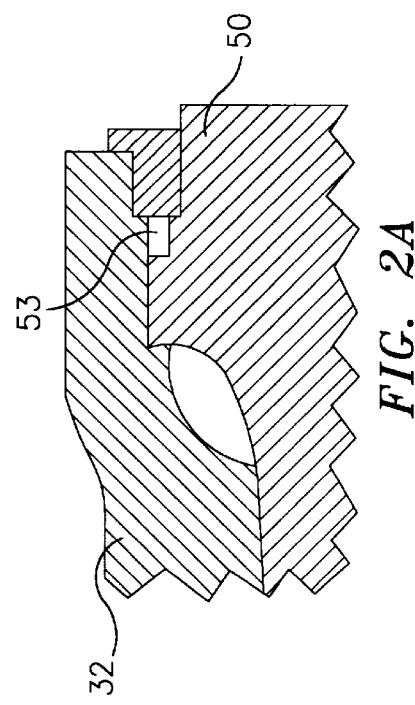

Pressure is then released on piston 44 (see FIG. 3) on the stationary platen 30 for the removable tiebars only since the non-removable tiebars have a simple nut and thread assembly as described above. All tiebars on the movable platen are still locked. Hydraulic pressure is applied to mold break cylinder 53 on the movable platen for the removable tiebars (clearly shown in FIG. 2A) that urges piston 50, locked to tiebar 34, to urge the removable tiebars towards the stationary platen, thereby pushing release piston 44 and creating clearance between teeth 36 on the tiebar and teeth 38 on sleeve 40 for the removable tiebars on the stationary platen. During this operation the movable platen 32 should not move as the five non-removable tiebars remain locked on the movable platen. This may be verified by sensors (not shown).

Sleeve 40 on stationary platen 30 is now rotated to disengage the teeth on the removable tiebars and unlock the removable tiebars from the stationary platen, i.e., in this case three out of the eight tiebars.

Figure 4:
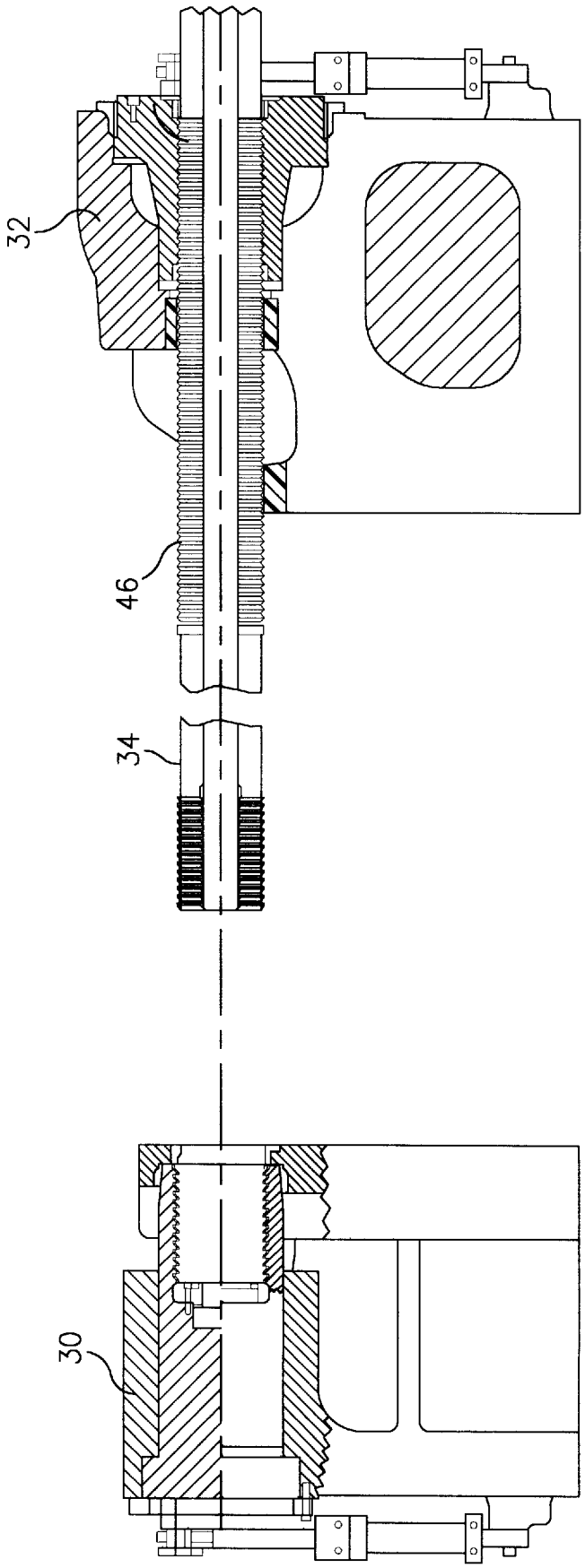
FIG. 4 is a side view of one tiebar with the movable platen in the open position.

The clamp pistons for the removable tiebars are now locked to the movable platen and the clamp pistons for the non-removable tiebars that were previously locked and disabled on the movable platen are now enabled and unlocked and the movable platen 32 moved to the position shown in FIG. 4 with the removable tiebars travelling with the movable platen as shown in FIG. 4 and the remaining five non-removable tiebars remaining fixed to the stationary platen and also engaging the movable platen. For example, the end of the non-removable tiebars desirably rest on movable platen tiebar support 46 shown in FIG. 2. The removable tiebars can then be readily removed from the disengaged stationary platen and from the movable platen by unlocking the removable tiebars from the movable platen, if necessary.

The tiebars which are to be removed are shorter than the non-removable tiebars because the locking sleeve assembly must be contained within the stationary platen thickness, i.e., in FIG. 4 the non-removable tiebars extends from the stationary to movable platen as discussed above. An advantage of the present invention, therefore, is no increase in the build length of the clamp assembly. This system is particularly useful on very large clamps and accordingly the tiebars may be very heavy. It is therefore important to optimize the balancing and stabilizing of heavy components that are being moved. This design provides that the tiebar is positioned approximately such that it is firmly held in the movable platen's securing/clamping assembly when it is being disengaged and moved away from the stationary platen, see FIG. 4. Since not all tiebars are removable and most remain permanently engaged to the stationary platen, these non-movable tiebars provide alignment and support for the movable platen as it moves the removable tiebars. The movable platen cannot tip or become unstable as it moves, thereby making this a safe automatic tiebar removal system.

Figure 5:
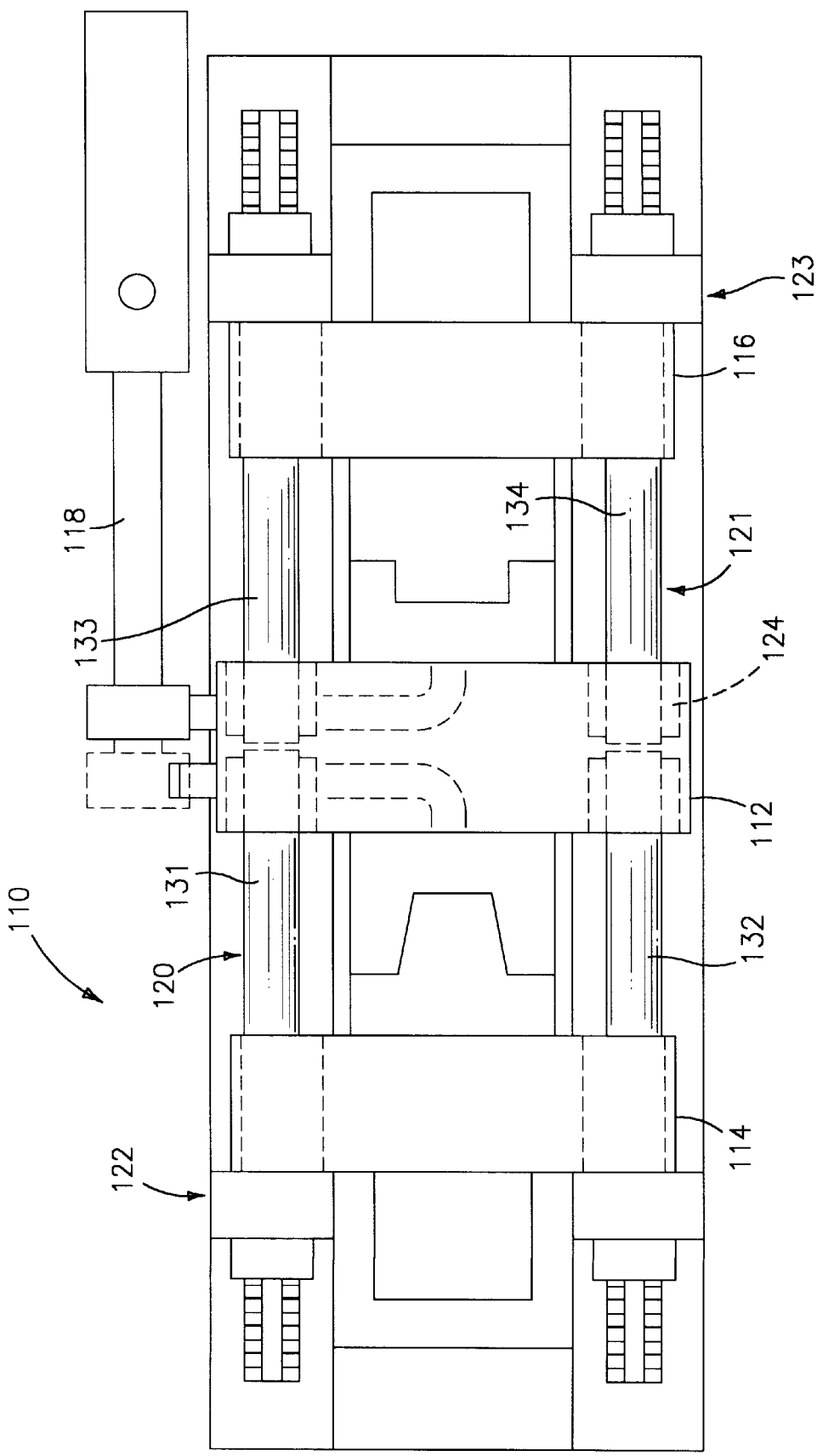
FIG. 5 is a simplified overhead view of another embodiment of the present invention.

The present invention is applicable to a tandem injection molding machine such as tandem machine 100 shown in the schematic top view of FIG. 5 similar to the tandem machine shown in U.S. Pat. No. 5,624,695, the disclosure of which is incorporated herein by reference. Machine 110 generally includes a fixed center platen 112, a first movable end platen 114 and a second movable end platen 116, an injection unit 118, tiebar system 120 for clamping the movable platen 114 and stationary platen 112, and tiebar system 121 for clamping the movable platen 116 and stationary platen 112. The embodiment of FIG. 5 shows four tiebars, two upper tiebars 131, 132 between platens 114 and 112 and two lower tiebars (not shown) between platens 114 and 112, and two upper tiebars 133, 134 between platens 112 and 116 and two lower tiebars (not shown) between platens 112 and 116. Although four (4) tiebars are shown for each of tiebar system 120 and tiebar system 121, naturally the exact number of tiebars for each system will depend on requirements, so that for example more than four tiebars may be used. In the embodiment of FIG. 5, the two upper tiebars between each platen are removable and the two lower tiebars are stationary; however, naturally one could provide that only one of each of the upper tiebars is removable, if desired. Thus, clamping assemblies 122 and 123 are provided for the movable platens 114 and 116 which have the structure of the clamping assemblies on the movable platen 32 shown in FIG. 2. In addition, stationary platen 112 contains clamping assemblies 124 for the removable tiebars which have the structure of the clamping assemblies for the removable tiebars on stationary platen 30 shown in FIG. 2. Thus, tiebars 131, 132 and 133, 134 would be separately removable from the stationary platen in a manner as previously described for in FIGS. 1–4. Thus, in FIG. 5 tiebar systems 120 and 121 are separate from each other as clearly shown in FIG. 5 and the removable tiebars may be separately removed. Therefore, tiebar system 120 connects stationary platen 112 with movable platen 114 as in FIGS. 1–4, and tiebar system 121 connects stationary platen 112 with movable platen 116 also as in FIGS. 1–4 so that one can remove the removable upper tiebars between platens 112 and 114 without removing the upper removable tiebars between platens 112 and 116. The lower tiebars would provide the stability between platens. Thus, the embodiment of FIG. 5 shows a two platen clamp which has three platens, with a first clamp device operating on platens 112 and 114 while a second clamp device operates on platens 112 and 116.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method for removing tiebars, which comprises:

providing a horizontal clamp device having two platens, with a movable platen and a fixed platen and with a plurality of tiebars extending therebetween and with at least one mold half affixed to each platen and with at least one of the tiebars being removable and the balance being non-removable;

clamping the removable tiebars to the stationary platen, and fixedly securing the non-removable tiebars to the stationary platen;

moving the movable platen to a mold open position;

clamping each tiebar to the movable platen;

unclamping the tiebars to be removed from the stationary platen while leaving the non-removable tiebars fixedly secured to the stationary platen;

unclamping the non-removable tiebars from the movable platen; and moving the movable platen away from the stationary platen with the removable tiebars disengaged from the stationary platen and solely supported by the movable platen while the non-removable tiebars remain fixedly secured to the stationary platen, to permit removal of the removable tiebars.

2. Method according to claim 1, wherein the removable tiebars disengaged from the stationary platen are supported solely by the movable platen.

3. Method according to claim 1, wherein less than the total number of tiebars are removable.

4. Method according to claim 3, including four upper tiebars and four lower tiebars, including the step of removing at least one of the upper tiebars.

5. Method according to claim 1, including providing a locking sleeve with locking sleeve teeth, wherein said removable tiebars are clamped to the stationary platen by engaging said locking sleeve teeth with tiebar teeth on the removable tiebars to lock the removable tiebars on the stationary platen, and wherein said removal tiebars are unclamped from said stationary platen by disengaging said locking sleeve teeth and said teeth on the removable tiebars to unlock the removable tiebars from the stationary platen.

6. Method according to claim 5, including providing a gap between the locking sleeve teeth and tiebar teeth to provide clearance for moving the locking sleeve.

7. Method according to claim 6, including moving a piston against the end of the removable tiebars on the stationary platen to push against the end of the removable tiebars to eliminate said gap on clamping the removable tiebars to the stationary platen.

8. Method according to claim 5, including engaging clamp piston teeth with tiebar teeth on the movable platen to lock the tiebars on the movable platen, and disengaging said clamp piston teeth and tiebar teeth on the movable platen to unlock the tiebars from the movable platen.

9. Method according to claim 1, including moving the movable platen away from the stationary platen with the removable tiebars engaged with the movable platen and the non-removable tiebars disengaged from the movable platen.

10. Method according to claim 1, wherein said device is on an injection molding machine.

11. Method according to claim 10, wherein said machine is a tandem injection molding machine.

12. Apparatus for removing tiebars, which comprises:

a horizontal clamp device having two platens, with a movable platen and a stationary platen, wherein the movable platen is movable relative to said stationary platen to form a mold closed and mold open position;

a plurality of tiebars extending between the movable and stationary platen with at least one of said tiebars being removable and the balance being non-removable;

at least one mold half adjacent to each platen;

clamping means to clamp each tiebar to the movable platen, clamping means to clamp the removable tiebars to the stationary platen, and means to fixedly secure the non-removable tiebars to the stationary platen;

means to unclamp the removable tiebars from the stationary platen while leaving the non-removable tiebars fixedly secured to the stationary platen;

means to unclamp the non-removable tiebars from the movable platen while leaving the removable tiebars clamped to the movable platen;

means to move the movable platen away from the stationary platen to disengage the removable tiebars from the stationary platen wherein the removable tiebars are solely supported by the movable platen;

whereby the movable platen may be moved away from the stationary platen with the removable tiebars disengaged from the stationary platen while the non-removable tiebars remain secured to the stationary platen to permit removal of the removable tiebars.

13. Apparatus according to claim 12, wherein the removable tiebars disengaged from the stationary platen are supported solely by the movable platen.

14. Apparatus according to claim 12, including four upper and four lower tiebars, with at least one of the upper tiebars being removable.

15. Apparatus according to claim 14, including a locking sleeve with teeth adjacent the removable tiebars on the stationary platen and corresponding teeth on the adjacent removable tiebars, and means to engage and disengage the locking sleeve teeth with the tiebar teeth to respectively lock and unlock the removable tiebars on the stationary platen.

16. Apparatus according to claim 15, including a gap between the locking sleeve teeth and the tiebar teeth to provide clearance for moving the locking sleeve.

17. Apparatus according to claim 16, including a piston adjacent the end of the removable tiebars on the stationary platen operative to push against the end of the removable tiebars to eliminate said gap on clamping the removable tiebars to the stationary platen.

18. Apparatus according to claim 12, including a clamp piston with teeth adjacent the tiebars on the movable platen and corresponding teeth on the adjacent tiebars, and means to engage and disengage the clamp piston teeth with the tiebar teeth to respectively lock and unlock the tiebars on the movable platen.

19. Apparatus according to claim 12, wherein said device is on an injection molding machine.

20. Apparatus according to claim 19, wherein said injection molding machine is a tandem injection molding machine.

21. Method according to claim 1, including the step of providing that the removable tiebars are shorter than the non-removable tiebars.

22. Apparatus according to claim 12, wherein the removable tiebars are shorter than the non-removable tiebars.

* * * * *